United States Patent

Aokura et al.

Patent Number: 5,600,520
Date of Patent: Feb. 4, 1997

[54] LAMINATED MAGNETIC HEAD CORE

[75] Inventors: Isamu Aokura, Osaka; Kumio Nago, Nara-ken; Hitoshi Yamanishi, Higashiosaka; Hiroshi Sakakima, Tsuzuki-gun; Youichi Ohnishi, Higashiosaka, all of Japan

[73] Assignee: Matsushita Electric Industrial Co., Ltd., Osaka, Japan

[21] Appl. No.: 441,947

[22] Filed: May 16, 1995

Related U.S. Application Data

[63] Continuation of Ser. No. 181,312, Jan. 13, 1994, abandoned.

[30] Foreign Application Priority Data

Jan. 14, 1993 [JP] Japan ................................ 5-004641

[51] Int. Cl.$^6$ .......................................... G11B 5/147
[52] U.S. Cl. .......................... 360/126; 428/216; 428/336; 428/692; 428/698; 428/900
[58] Field of Search ........................... 428/216, 336, 428/692, 698, 900; 360/126

[56] References Cited

U.S. PATENT DOCUMENTS

| | | | |
|---|---|---|---|
| 4,231,816 | 11/1980 | Cuomo et al. | 148/31.55 |
| 4,576,876 | 3/1986 | Shiiki et al. | 428/679 |
| 4,836,865 | 6/1989 | Sakakima et al. | 148/306 |
| 5,018,038 | 5/1991 | Nakanishi | 360/126 |
| 5,028,280 | 7/1991 | Ihara et al. | 148/306 |
| 5,108,837 | 4/1992 | Mallary | 428/336 |
| 5,117,321 | 5/1992 | Nakanishi | 360/120 |
| 5,403,457 | 4/1995 | Nago et al. | 204/192.2 |
| 5,452,167 | 9/1995 | Nago | 360/126 |

FOREIGN PATENT DOCUMENTS 54-3238  2/1979  Japan.

*Primary Examiner*—Stevan A. Resan
*Attorney, Agent, or Firm*—McDermott, Will & Emery

[57] ABSTRACT

In a laminated magnetic head core, Fe—M—N system soft magnetic thin films (M being at least one element selected from the group consisting of Ta, Nb, Zr, and Hf) and non-magnetic insulating films are alternately laminated. Each of the soft magnetic thin films is 0.2–10 μm thick. Each of the non-magnetic insulating films is 10 through 1000 nm thick. One of the soft magnetic thin films shows high magnetic permeability in a different direction from that of an adjacent soft magnetic thin film via the non-magnetic insulating film within a film surface of the soft magnetic thin film.

2 Claims, 5 Drawing Sheets

LAMINATED MAGNETIC HEAD CORE

This is a continuation of application Ser. No. 08/181,312 filed Jan. 13, 1994 now abandoned.

BACKGROUND OF THE INVENTION

The present invention relates to a laminated magnetic head core for use in VTR or the like system driven in the high frequency band region.

As it has been increasingly required to record data with high density in the field of magnetic recording, a magnetic recording medium is designed to show higher coercive force. For this purpose, a magnetic head core is necessary to have the high saturation magnetic flux density (mainly influencing the recording characteristic of the magnetic head) and high magnetic permeability (mainly influencing the playback or reproducing characteristic of the magnetic head). At the same time, since the carrier frequency becomes higher, good recording/reproducing performance in the high frequency band, namely, not lower than several tens MHz is needed for the magnetic head. However, a conventional ferrite head cannot meet these requirements because the saturation magnetic flux density is small, and the ferrite head is magnetically saturated to a medium with high coercive force, resulting in poor recording quality. Such being the circumstances, Sendust (Fe—Al—Si system) or cobalt base amorphous alloy is now actually used for the magnetic head.

Sendust or cobalt base amorphous alloy has the saturation magnetic flux density so small as approximately 1 T and cannot record well to a magnetic recording medium with high coercive force. Therefore, a microcrystal and soft magnetic film, e.g., Fe—(Ta,Zr,Nb,Hf)—(B,C,N) is catching attention lately.

Meanwhile, there are roughly two kinds of magnetic heads using an alloy film, one is a MIG head equipped with an alloy film only in the vicinity of the gap of the ferrite head and the other is a laminated head wherein alloy films are laminated on a non-magnetic substrate via non-magnetic insulating films.

The above-referred MIG head and laminated head using alloy films in the prior art will be depicted below.

FIG. 5 indicates the constitution of a conventional MIG head, in which 21 shows ferrite, 22 is a gap, 23 is a magnetic film formed of Sendust alloy or cobalt base amorphous alloy, etc. in the vicinity of the gap 22, and 24 represents glass.

In the constitution in FIG. 5, since ferrite which shows relatively good magnetic permeability in several MHz and an alloy film showing higher saturation magnetic flux density than ferrite are combined, the performance required for the magnetic head is improved.

FIG. 6 illustrates a conventional laminated head. In FIG. 6, 31 and 32 are a non-magnetic substrate and a gap, respectively. A magnetic film 33 is obtained by alternately laminating several μm Sendust alloy films or cobalt base amorphous alloy films and non-magnetic insulating films. Reference numeral 34 denotes glass.

In the structure of FIG. 6 without using ferrite, slide noises peculiar to ferrite are not generated, so that the performance of the head is improved.

The MIG head as above is not free from slide noises specific to ferrite, and invites more slide noises particularly in the high frequency band. The playback characteristic in the high frequency band is consequently deteriorated. In contrast, when the laminated head which has Sendust alloy films or cobalt base amorphous alloy films alternately laminated over the non-magnetic insulating films is used, slide noises can be eliminated, but the soft magnetic characteristic is degraded if each magnetic layer is reduced to approximately 3 μm thickness or smaller as disclosed in Japanese Patent Publication No. 54-3238 (3238/1979). That is, it is impossible to reduce the thickness of each magnetic layer to not larger than 3 μm or so. Therefore, the eddy current core loss cannot be satisfactorily restricted and the isotropic high magnetic permeability cannot be secured although it is an important factor for the laminated head to be used in VTR, etc. driven in the high frequency band.

If an Fe—(Ta,Nb,Zr,Hf)—N system soft magnetic thin film with high saturation magnetic flux density is made thinner so as to improve the high frequency characteristic, specifically, not larger than 1 μm, although the high magnetic permeability is obtained in a direction difficult to magnetize by inducing the uniaxial anisotropy through a thermal treatment in the static magnetic field, etc., the desired isotropic high magnetic permeability is not achieved.

SUMMARY OF THE INVENTION

The object of the present invention is therefore to provide a laminated magnetic head core which shows isotropic high magnetic permeability in the high saturation magnetic flux density and high frequency band.

In accomplishing this object, according to one aspect of the present invention, there is provided a laminated magnetic head core wherein Fe—M—N system soft magnetic thin films (M being at least one element selected from the group consisting of Ta, Nb, Zr, and Hf) and non-magnetic insulating films are alternately laminated, each of the soft magnetic thin films being 0.2–10 μm thick, and each of the non-magnetic insulating films being 10 through 1000 nm thick, one of the soft magnetic thin films showing high magnetic permeability in a different direction from that of an adjacent soft magnetic thin film via the non-magnetic insulating film within a film surface of the soft magnetic thin film.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
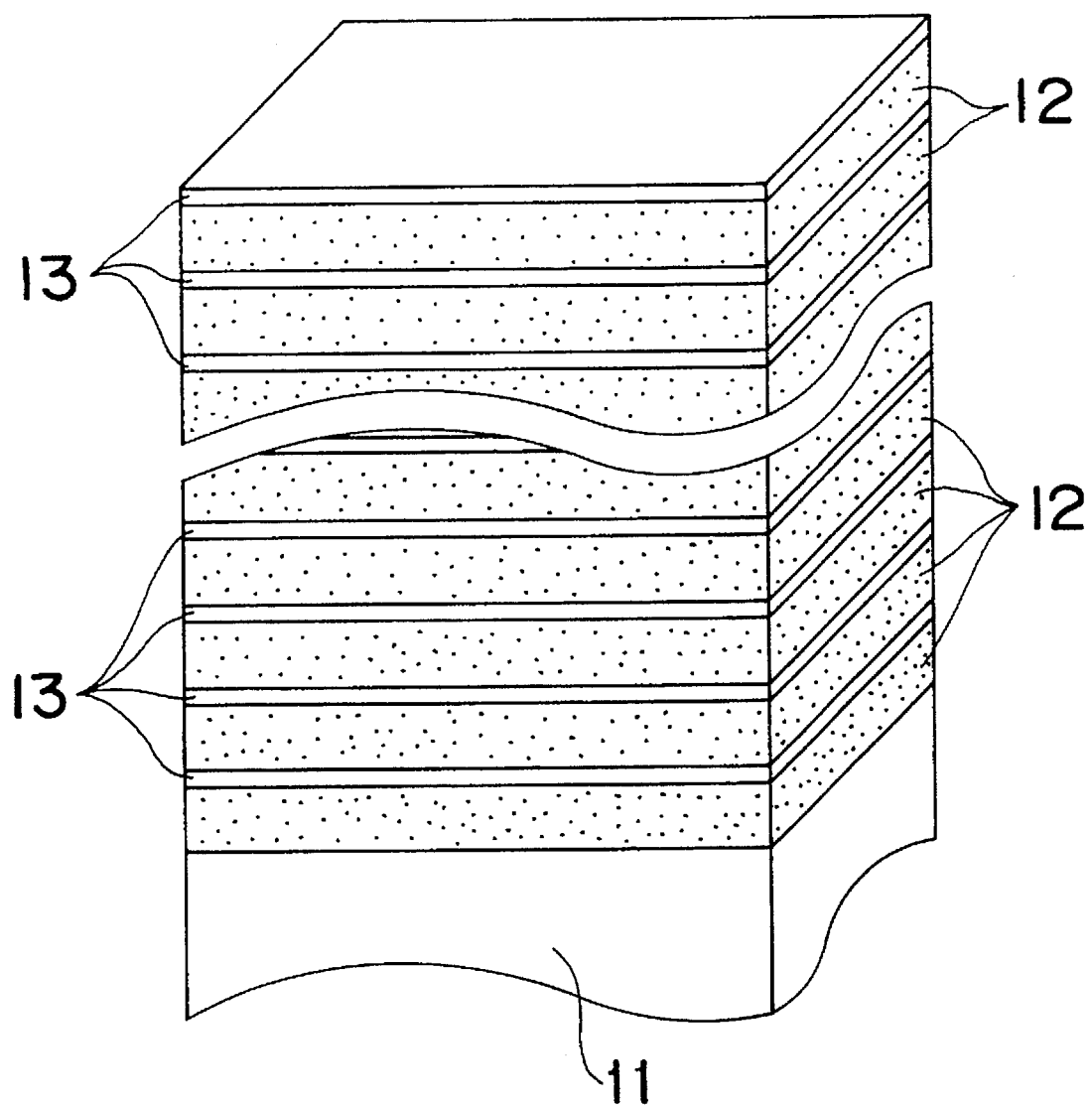
FIG. 1 is a schematic diagram of a laminated magnetic head of a first embodiment of the present invention.

Before the description of the present invention proceeds, it is to be noted that like parts are designated by like reference numerals throughout the accompanying drawings.

A first embodiment of the present invention will be depicted with reference to the accompanying drawings.

FIG. 1 schematically shows a laminated magnetic head core of the first embodiment of the present invention.

In FIG. 1, reference numeral 11 denotes a non-magnetic substrate and 12 denotes a soft magnetic thin film, specifically, an Fe—Ta—N system soft magnetic thin film in the embodiment. A non-magnetic insulating film 13 is formed of $SiO_2$ in the instant embodiment. The Fe—Ta—N system soft magnetic thin films 12 are laminated alternately via the non-magnetic insulating films 13. The Fe—Ta—N system soft magnetic thin films 12 adjacent to each other via the non-magnetic insulating films 13 have layers showing high magnetic permeability within the respective film surfaces in different directions from each another. The laminated head core thus indicates the isotropic high magnetic permeability within the film surface as a whole. At this time, preferably, if each Fe—Ta—N system soft magnetic thin film 12 has first through fourth different directions at intervals of 45 degree, one of the directions which has the highest magnetic permeability is selected and then the selected direction of the soft magnetic thin film 12 is different from the other one of the directions which has the highest magnetic permeability is selected. For example, the third direction which has the highest magnetic permeability in the first soft magnetic thin film 12 is selected therein, the first direction which has the highest magnetic permeability in the second soft magnetic thin film 12 is selected therein, and the third direction which has the highest magnetic permeability in the third soft magnetic thin film 12 is selected therein. In this example, one direction which has the second in height except for the highest magnetic permeability in each soft magnetic thin film 12 can be selected there.

For obtaining the Fe—Ta—N system soft magnetic thin film 12 in the reactive sputtering method wherein $N_2$ gas is introduced into Ar gas, an Fe—Ta alloy is used as a target. The anisotropy of the magnetic permeability within the film surface of each layer of the Fe—Ta—N system soft magnetic thin film 12 is controlled by changing the size of a high frequency bias applied to the substrate for every layer. Therefore, the laminated magnetic head core shows the isotropic high magnetic permeability within the film surface as a whole. The forming condition of the Fe—Ta—N film is indicated in Table 1 below. The composition of the produced film is, through an RBS analysis (Rutherford back scattering), 10 atomic % Ta, 10 atomic % N, and the remaining % Fe. The saturation magnetic flux density of the obtained laminated magnetic head core is approximately 1.6 T. The laminated magnetic head core is thermally treated at 550° C. for one hour in vacuum in the absence of a magnetic field.

TABLE 1

| Target | Fe—Ta alloy |
| --- | --- |
| Target power source | High frequency (13.56 MHz) |
| Sputtering power | 2 kW |
| Sputtering pressure | 0.53 Pa (4 × 10⁻³ Torr) |
| Partial pressure of $N_2$ | 4% |

The non-magnetic insulating film 13 is formed by sputtering in Ar gas with using $SiO_2$ as a target. The sputtering condition of the $SiO_2$ film is shown in Table 2 below.

TABLE 2

| Target | $SiO_2$ |
| --- | --- |
| Target power source | High frequency (13.56 MHz) |
| Sputtering power | 1 kW |
| Sputtering pressure | 0.93 Pa (7 × 10⁻³ Torr) |

For one instance, the thicknesses of the respective layers of three kinds of the Fe—Ta—N system soft magnetic thin film 12 are set to 0.5 µm (× ten layers), 1 µm (× five layers), 2.5 µm (× two layers) to obtain the total thickness of the Fe—Ta—N system soft magnetic thin film of 5 µm while the thickness of each layer of the $SiO_2$ insulating film 13 is maintained 0.15 µm. The change of real number parts µ' of the complex magnetic permeabilities at this time to the thicknesses of the Fe—Ta—N system soft magnetic thin films in the frequency bands 30 MHz and 80 MHz is indicated in a diagram of FIG. 2.

Figure 2:
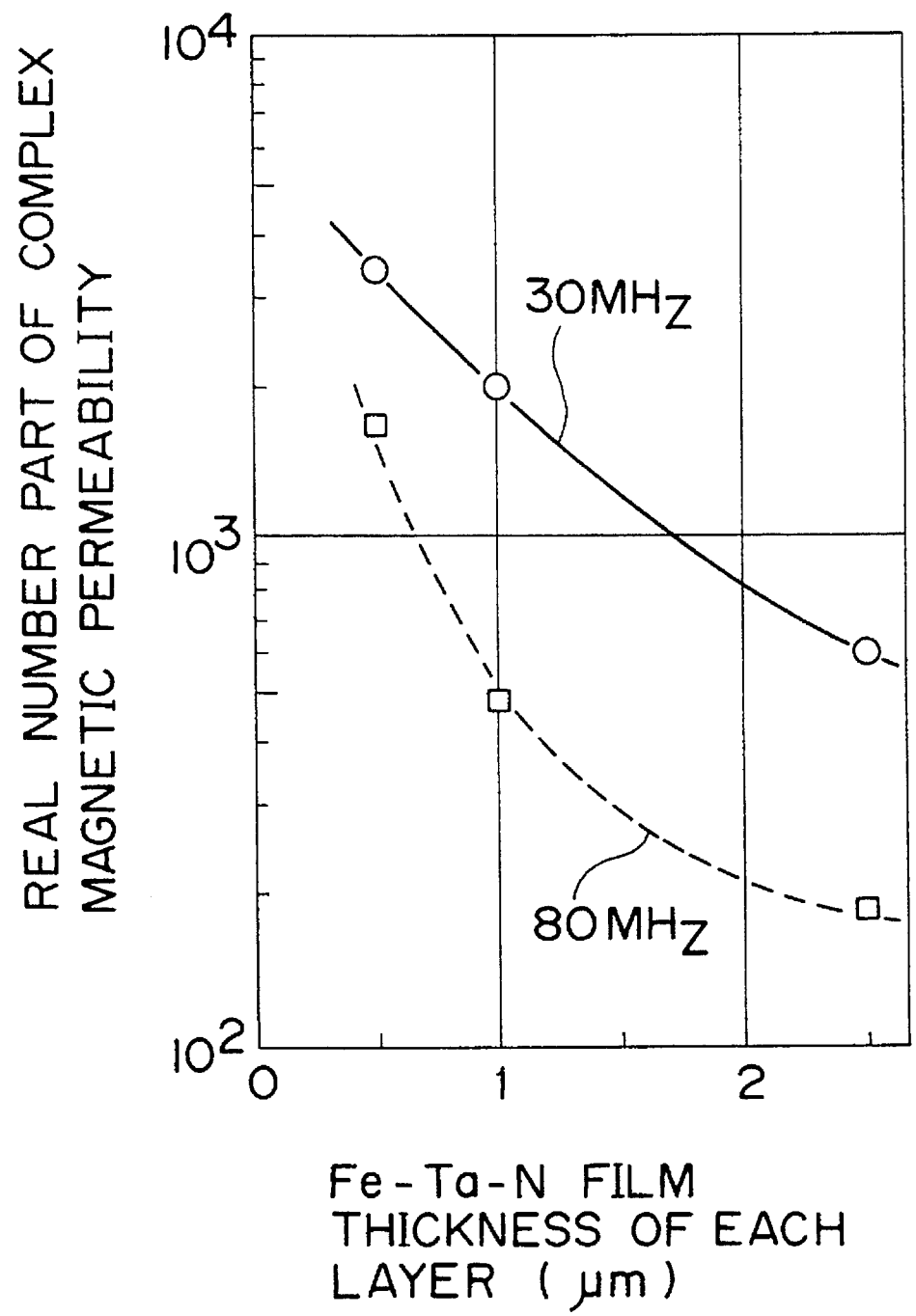
FIG. 2 is a diagram showing the change of a real number part of the complex magnetic permeability to the thickness of an Fe—Ta—N system soft magnetic thin film in the first embodiment.

As is clear from FIG. 2, as the thickness of each layer of the Fe—Ta—N system soft magnetic thin film is decreased, the magnetic permeabilities µ' in the high frequency bands (30 MHz and 80 MHz) indicate larger values. When the Fe—Ta—N system soft magnetic thin film is 1 µm thick or less as in the prior art, the isotropic high magnetic permeability required in the laminated magnetic head core cannot be achieved. However, in accordance with the embodiment, since the direction of the Fe—Ta—N system soft magnetic thin film to show the high magnetic permeability within the film surface is changed via the $SiO_2$ insulating film, the isotropic high magnetic permeability is realized within the film surface of the laminated magnetic head core as a whole even if each layer of the Fe—Ta—N system soft magnetic thin film is 1 µm thick or less. In the case where the thickness of each layer of the Fe—Ta—N system soft magnetic thin film is less than 0.2 µm, the isotropic high magnetic permeability is not gained.

Figure 3:
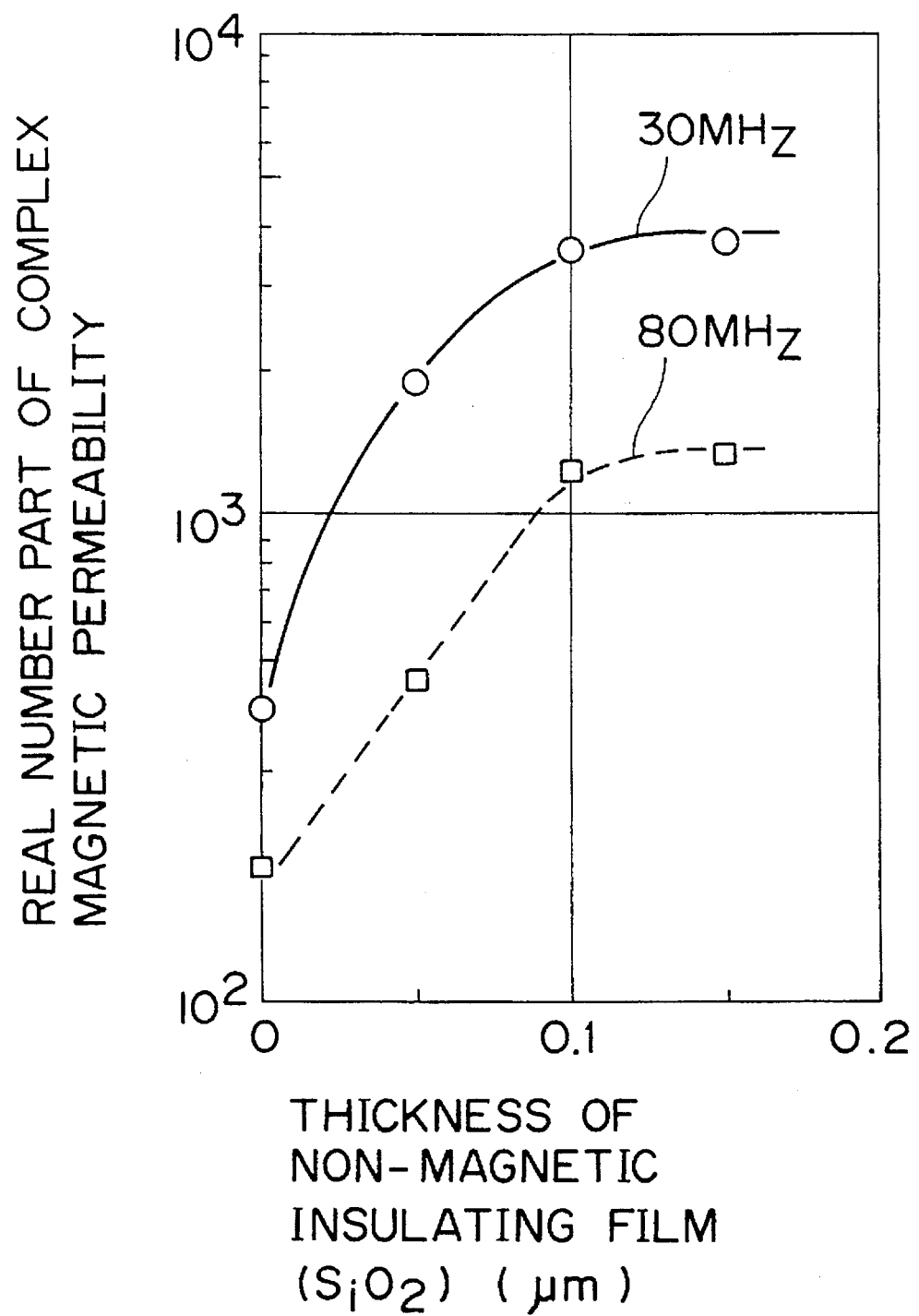
FIG. 3 is a diagram showing the change of a real number part of the complex magnetic permeability to the thickness of an SiO2 insulating film in the first embodiment.

Next, using the similar method, the thicknesses of the respective layers of four kinds of the $SiO_2$ insulating film 13 are set to 0 µm, 0.05 µm, 0.1 µm, and 0.15 µm while each layer of the Fe—Ta—N system soft magnetic thin film is 0.5 µm, and the change of real number parts µ' of the complex magnetic permeabilities to the thicknesses of the $SiO_2$ insulating films in the frequency bands 30 MHz and 80 MHz is shown in FIG. 3.

As is understood from FIG. 3, in accordance with the increase of the thickness of each layer of the $SiO_2$ insulating film, the value of the real number part µ' of the laminated magnetic head core in the high frequency band becomes large. When the thickness of each of the $SiO_2$ insulating film is not smaller than 0.15 µm, the dependency of the real number part µ' on the frequency is hardly changed.

A second embodiment of the present invention will be described hereinbelow with reference to the corresponding drawings.

In the second embodiment, the constitution of a laminated magnetic head core is the same as in the first embodiment, except that the total thickness of the laminated magnetic head core is set to be approximately 20 µm as required for a laminated head. The laminated magnetic head core is manufactured in the same manner as in the first embodiment. That is, while each layer of the $SiO_2$ insulating film is formed 0.15 µm thick, the thicknesses of the respective layers of three kinds of the Fe—Ta—N system soft magnetic thin film are set to 0.5 µm, 1 µm, and 2.5 µm to construct the head core to be 20 µm as a whole. The thus-obtained laminated magnetic head core displays the isotropic high magnetic permeability within the film surface, similar to the first embodiment. The frequency dependency of real number parts µ' of the complex magnetic permeabilities in the embodiment is shown in FIG. 4.

Figure 4:
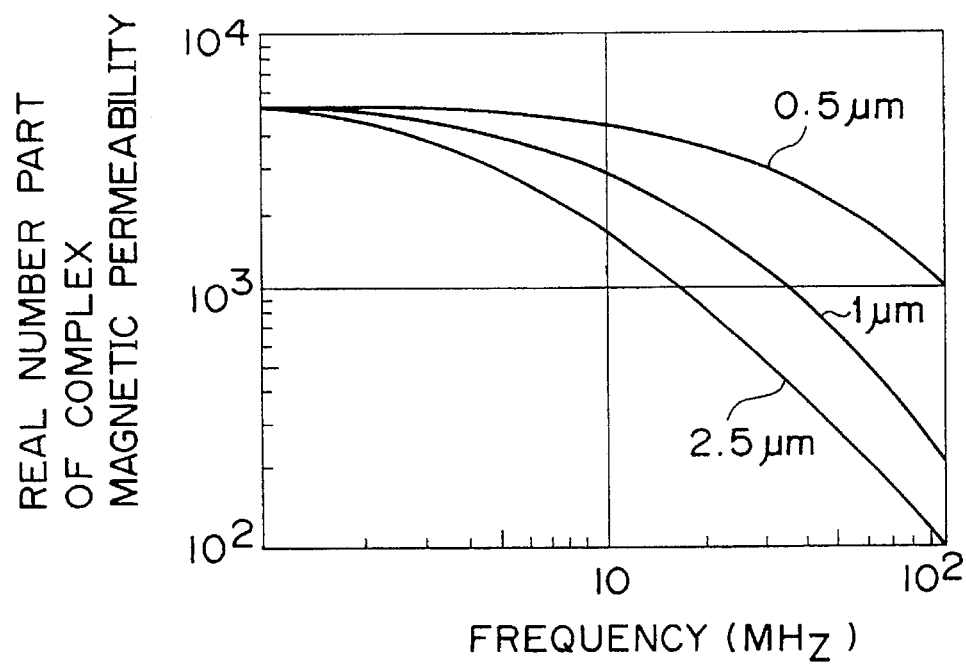
FIG. 4 is a diagram showing the dependency on the frequency of a real number part of the complex magnetic permeability when the thickness of each layer of an Fe—Ta—N system soft magnetic thin film in a second embodiment is changed.
Figure 5:
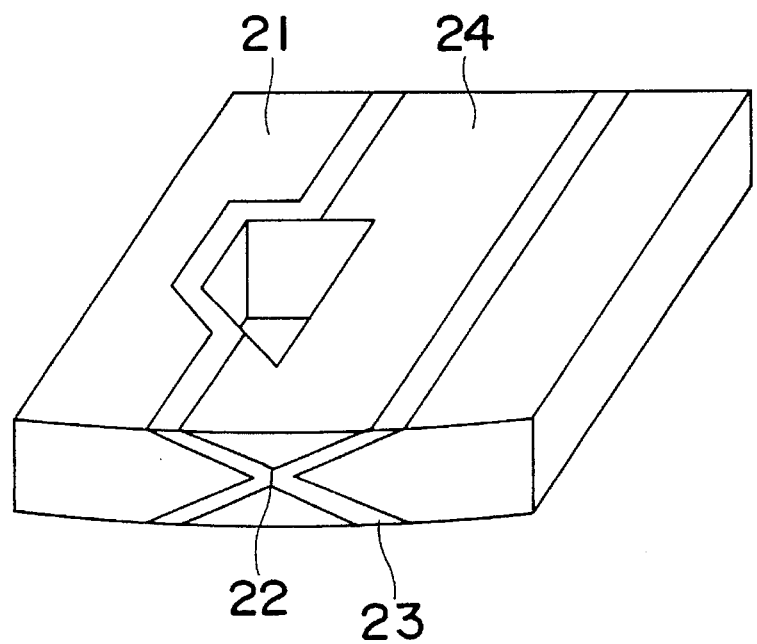
FIG. 5 is a schematic diagram of a conventional MIG head.
Figure 6:
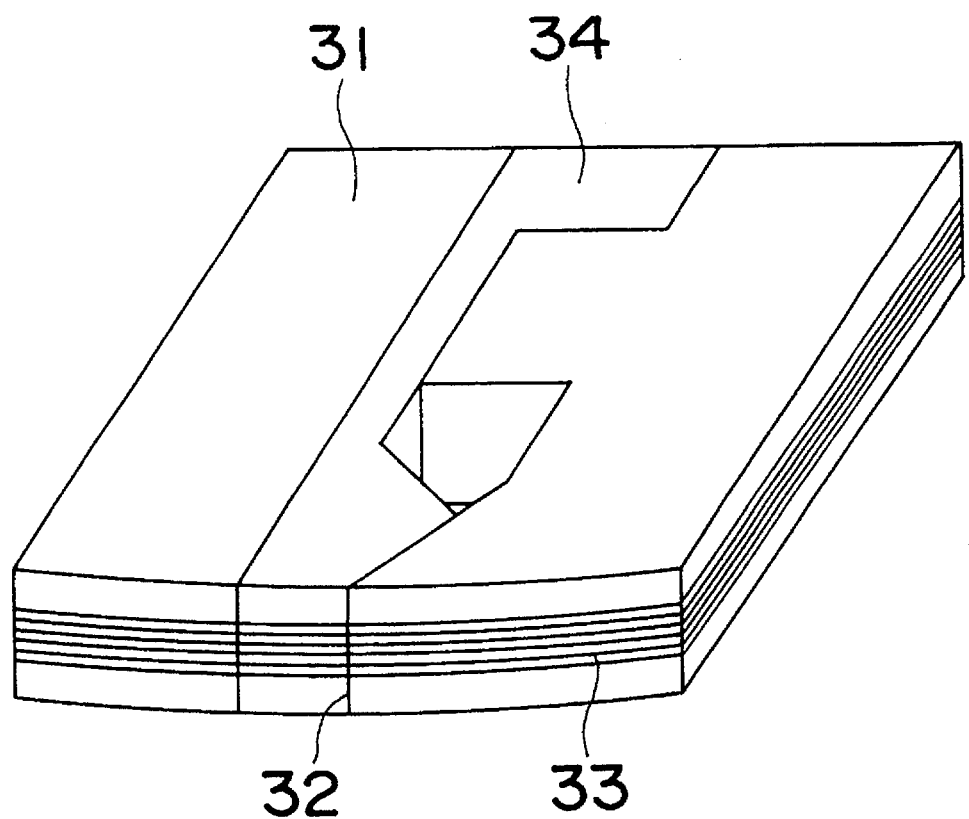
FIG. 6 is a schematic diagram of a conventional laminated head.

It is detected in FIG. 4 that the value of µ' is increased in the high frequency band not lower than several tens MHz as each layer of the Fe—Ta—N system soft magnetic thin film is thinner. As shown in FIG. 4, the isotropic high magnetic permeability is realized also when the laminated magnetic head core is made 20 µm thick as is necessary for a laminated head.

If each layer of the Fe—Ta—N system thin film is thicker than 10 µm, the value of the real number part µ' becomes not larger than 1000 at the frequency 5 MHz, and therefore this laminated magnetic head core is found not suitable to be used for a system operating in the high frequency band.

In the above first and second embodiments, the high magnetic permeability within the film surface of each layer of the Fe—Ta—N system soft magnetic thin film of each laminated magnetic head core is controlled by the size of the high frequency bias applied to the substrate during sputtering. Alternatively, the high magnetic permeability can be controlled also by the direction of incidence of film forming particles to the substrate.

Although the soft magnetic thin film is an Fe—Ta—N system film, the other kind of soft magnetic thin film having high saturation magnetic flux density such as Fe—M—N system film (wherein M is at least one or more kinds of elements selected from the group consisting of Ta, Nb, Zr, and Hf) can be employed. Moreover, the non-magnetic insulating film can be formed of $Al_2O_3$ or the like in place of $SiO_2$.

As described hereinabove, in each laminated magnetic head core of the embodiments, soft magnetic thin films of 0.2–10 µm thickness and non-magnetic insulating films of several tens-several hundreds nm thickness are alternately laminated, and moreover, the soft magnetic thin films have layers showing the high magnetic permeability within the film surfaces in different directions via the non-magnetic insulating films. Accordingly, each laminated magnetic head core displays the isotropic high magnetic permeability superior in the high frequency band. Especially, even when each of the soft magnetic thin films is 1 µm thick or less, the isotropic high magnetic permeability is ensured, so that the laminated magnetic head core is useful in a system driven in the high frequency band.

Here, the reason that the thickness of the soft magnetic thin film is 0.2–10 µm is as follows: if the thickness of each layer of the Fe—Ta—N system soft magnetic thin film is less than 0.2 µm, the isotropic high magnetic permeability is not gained, and if the thickness of each layer of the Fe—Ta—N system thin film is more than 10 µm, the real number part µ' becomes not larger than 1000 at the frequency 5 MHz, and therefore this laminated magnetic head core is found not suitable to be used for a system operating in the high frequency band. The reason that the thickness of the non-magnetic insulating film is 10 nm through 1000 nm, preferably, several tens through several hundreds nm is as follows: if the thickness of the non-magnetic insulating film is less than 10 nm, the magnetic insulating effect may not be ensured, and if the thickness of the non-magnetic insulating film is more than 1000 nm, the soft magnetic thin films can not have sufficient thickness when the total thickness of the head core is predetermined.

Additionally, it is preferable that at least two directions of four directions in which one of the soft magnetic thin films shows high magnetic permeability are different from those of an adjacent soft magnetic thin film via the non-magnetic insulating film within the film surface of the soft magnetic thin film.

According to the invention, since each magnetic thin film is formed thin, the eddy current core loss is reduced and the isotropic high magnetic permeability is obtained.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A laminated magnetic head core wherein Fe—M—N system soft magnetic thin films wherein M is being at least one element selected from the group consisting of Ta, Nb, Zr, and Hf and non-magnetic insulating films are alternately laminated, wherein, each of the soft magnetic thin films being 0.2–10 µm thick, and each of the non-magnetic insulating films being 10 through 1000 nm thick, each of the soft magnetic thin films having an axis of easy magnetization within its film surface which is oriented in a direction different from the axes of easy magnetization within the film surface of the adjacent soft magnetic thin films, thus providing enhanced isotropic magnetic permeability and reduced eddy current loss over cores wherein said axes of easy magnetization are oriented in the same direction within each film surface.

2. The laminated magnetic head core as claimed in claim 1, wherein the core comprises at least four soft magnetic thin films, each having an axis of easy magnetization within its film surface and at least two of said axes of magnetization being different from axes of easy magnetization within the film surface of adjacent soft magnetic thin films.

* * * * *